(12) United States Patent
Yin

(10) Patent No.: US 8,541,489 B2
(45) Date of Patent: Sep. 24, 2013

(54) FLAME RESISTANT SEMIAROMATIC POLYAMIDE RESIN COMPOSITION INCLUDING ZINC STANNATE, AND ARTICLES THEREFROM

(75) Inventor: Yige Yin, Tochigi-ken (JP)

(73) Assignee: E I du Pont de Nemours and Company, Wilmington, DE (US)

( * ) Notice: Subject to any disclaimer, the term of this patent is extended or adjusted under 35 U.S.C. 154(b) by 571 days.

(21) Appl. No.: 12/217,031

(22) Filed: Jul. 1, 2008

(65) Prior Publication Data

US 2010/0001430 A1  Jan. 7, 2010

(51) Int. Cl.
*B29C 45/46* (2006.01)

(52) U.S. Cl.
USPC ........... 524/126; 264/241; 524/135; 524/133; 524/434

(58) Field of Classification Search
USPC ........................................................ 524/126
See application file for complete search history.

(56) References Cited

U.S. PATENT DOCUMENTS

| 5,773,556 A | 6/1998 | Kleiner et al. |
| 6,255,371 B1 | 7/2001 | Schlosser et al. |
| 6,547,992 B1 | 4/2003 | Schlosser |
| 2005/0014874 A1* | 1/2005 | Hoerold et al. ............... 524/126 |
| 2005/0119379 A1* | 6/2005 | Martens et al. ............... 524/115 |
| 2006/0089435 A1* | 4/2006 | Hoerold et al. ............... 524/115 |

FOREIGN PATENT DOCUMENTS

| WO | WO 96/09344 | 3/1996 |
| WO | WO2005/061606 | 7/2005 |
| WO | WO2005/116139 | 8/2005 |
| WO | WO2005/121234 | 12/2005 |

* cited by examiner

*Primary Examiner* — Doris Lee

(57) ABSTRACT

Disclosed are polyamide compositions containing non-halogenated flame retardant and zinc stannate that have reduced corrosion effects on melt processing equipment.

10 Claims, No Drawings

FLAME RESISTANT SEMIAROMATIC POLYAMIDE RESIN COMPOSITION INCLUDING ZINC STANNATE, AND ARTICLES THEREFROM

FIELD OF THE INVENTION

The present invention relates to non-halogenated flame retardant thermoplastic semiaromatic polyamide compositions having reduced corrosion effects on melt processing equipment.

BACKGROUND OF THE INVENTION

Polyamide resins possess excellent mechanical properties, moldability, and chemical resistance and have therefore been used in automotive parts, electric/electronic components, mechanical components, and many other applications. Articles made from polyamide resins can possess extremely desirable physical properties. However, in certain applications, it is desirable that polyamide resin compositions be flame retardant and meet the UL-94 standard for a high degree of flame retardance. This need has promoted research into a variety of methods for imparting flame retardance to polyamide resins. A common method of imparting flame retardance to thermoplastic resin compositions involves incorporating a halogenated organic compound such as brominated polystyrene as a flame retardant along with an antimony compound that acts as a synergist for the flame retardant. However, the use of halogenated flame retardants has certain drawbacks in that these materials tend to decompose or degrade at the temperatures used to mold polyamide compositions. The degradation products can corrode the barrels of compounding extruders, the surfaces of molding machines, and other melt processing equipment halogenated flame retardants come in contact with at elevated temperatures. This problem can be particularly pronounced in the case of semiaromatic polyamide compositions, as these materials often have melting points that are significantly higher than those of many aliphatic polyamides. The degradation products of halogenated flame retardants can also result in molded articles that have poor surface appearance.

It would thus be desirable to obtain a non-halogenated flame retardant semiaromatic polyamide composition that leads to reduced levels of corrosion of melt processing equipment while satisfying certain regulatory requirements.

The use of non-halogenated flame retardants such as phosphate or phosphinate compounds with triazine derivatives has been disclosed in WO 96/09344. U.S. Pat. No. 5,773,556 discloses compositions comprising polyamide and phosphinate or diphosphinate. U.S. Pat. No. 6,255,371 discloses compositions comprising polymers such as polyamide or polyester, with a flame retardant comprising phosphinate or diphosphinate and melamine derivatives such as condensation products of melamine.

U.S. Pat. No. 6,547,992 discloses compositions comprising thermoplastic polymers such as polyamide 6 or 6,6; or polyester, with a flame retardant comprising phosphinate or diphosphinate and a synthetic inorganic compound and/or a mineral product, such as zinc stannate.

SUMMARY OF THE INVENTION

There is disclosed and claimed herein a flame retardant polyamide resin composition, comprising:

(a) about 30 to about 90 weight percent of a polyamide component comprising about 20 to 100 weight percent of at least one semiaromatic polyamide;
(b) at least one flame retardant comprising one or more of a phosphinate of the formula (I); a disphosphinate of the formula (II); and polymers of (I) and/or (II)

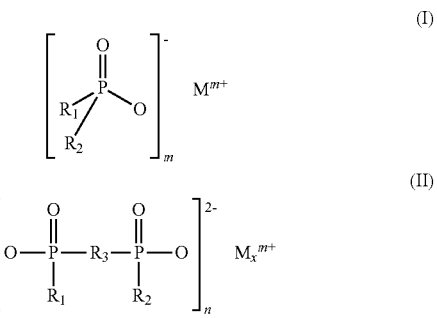

wherein $R_1$ and $R_2$ are identical or different and are $C_1$-$C_6$ alkyl, linear or branched, and/or aryl; $R_3$ is $C_1$-$C_{10}$-alkylene, linear or branched, $C_6$-$C_{10}$-arylene, -alkylarylene or -arylalkylene; M is calcium ions, magnesium ions, aluminum ions and/or zinc ions; m is 2 to 3; n is 1 or 3; and x is 1 or 2;

(c) zinc stannate; and
(d) 0 to about 60 weight percent of at least one inorganic reinforcing agent and/or filler, wherein the weight percentages of (a) and (d) are based on the total weight of the composition; wherein flame retardant (b) is present in an amount that is about 10 to about 45 percent of the weight of polyamide (a); and wherein zinc stannate (c) is present in an amount that is about 1 to about 50 percent of the weight of flame retardant (b).

Another embodiment of the invention is a method for molding a flame retardant semiaromatic polyamide resin composition, as disclosed above, comprising providing said polyamide resin composition; and melting and injecting said polyamide resin composition in a molding machine; at a temperature sufficient to provide a flowable melt; wherein the injecting of the resin composition comprising components (a), (b), (c) and optionally (d) provides at least 50% less corrosion of a check ring than that of injecting a resin composition comprising components (a) (b) and optionally (d); as measured in a Mold Corrosion Test, as disclosed below in the Examples, using a molding machine having a nozzle head with said check ring.

DETAILED DESCRIPTION OF THE INVENTION

The composition of the present invention comprises a thermoplastic polyamide component (a) comprising at least one semiaromatic polyamide; at least one phosphinate or diphosphinate based flame retardant (b); zinc borate (c); and optionally, at least one inorganic reinforcing agent and/or filler.

The thermoplastic polyamide component (a) comprises about 20 to 100 weight percent, or preferably about 40 to 100 weight percent, or more preferably about 60 to 100 weight percent of at least one semiaromatic polyamide, wherein the weight percentages are based on the total weight the polyamide component (a).

The semiaromatic thermoplastic polyamides are one or more homopolymers, copolymers, terpolymers, or higher polymers that are derived from monomers containing aromatic groups. Examples of monomers containing aromatic groups are terephthalic acid and its derivatives, isophthalic acid and its derivatives, p-xylylenediamine and m-xylylenediamine. It is preferred that about 5 to about 75 mole percent of the monomers used to make the aromatic polyamide used in the present invention contain aromatic groups, and more preferred that about 10 to about 55 mole percent of the monomers contain aromatic groups.

The semiaromatic aromatic polyamide may be derived from dicarboxylic acids or their derivatives, such one or more of adipic acid, sebacic acid, azelaic acid, dodecanedoic acid, terephthalic acid, isophthalic acid or their derivatives and other aliphatic and aromatic dicarboxylic acids and aliphatic $C_6$-$C_{20}$ alkylenediamines, aromatic diamines, and/or alicyclic diamines. Preferred diamines include hexamethylenediamine; 2-methylpentamethylenediamine; 2-methyloctamethylenediamine; trimethylhexamethylenediamine; 1,8-diaminooctane; 1,9-diaminononane; 1,10-diaminodecane; 1,12-diaminododecane; and m-xylylenediamine. It may also be derived from one or more lactams or amino acids such as 11-aminododecanoic acid, caprolactam, and laurolactam.

Examples of preferred semiaromatic polyamides include poly(m-xylylene adipamide) (polyamide MXD,6), poly(dodecamethylene terephthalamide) (polyamide 12,T), poly(decamethylene terephthalamide) (polyamide 10,T), poly(nonamethylene terephthalamide) (polyamide 9,T), hexamethylene adipamide/hexamethylene terephthalamide copolyamide (polyamide 6,T/6,6), hexamethylene terephthalamide/2-methylpentamethylene terephthalamide copolyamide (polyamide 6,T/D,T); hexamethylene adipamide/hexamethylene terephthalamide/hexamethylene isophthalamide copolyamide (polyamide 6,6/6,T/6,I); poly(caprolactam-hexamethylene terephthalamide) (polyamide 6/6,T); hexamethylene terephthalamide/hexamethylene isophthalamide (6,T/6,I) copolymer; and the like.

The polyamide component (a) may further comprise one or more aliphatic and/or alicyclic polyamides. The aliphatic and/or alicyclic polyamides may be derived from aliphatic and/or alicyclic monomers such as one or more of adipic acid, sebacic acid, azelaic acid, dodecanedoic acid, or their derivatives and the like, aliphatic $C_6$-$C_{20}$ alkylenediamines, alicyclic diamines, lactams, and amino acids. Preferred diamines include bis(p-aminocyclohexyl)methane; hexamethylenediamine; 2-methylpentamethylenediamine; 2-methyloctamethylenediamine; trimethylhexamethylenediamine; 1,8-diaminooctane; 1,9-diaminononane; 1,10-diaminodecane; 1,12-diaminododecane; and m-xylylenediamine. Preferred lactams or amino acids include 11-aminododecanoic acid, caprolactam, and laurolactam.

Preferred aliphatic polyamides include aliphatic polyamides such as polyamide 6; polyamide 6,6; polyamide 4,6; polyamide 6,10; polyamide 6,12; polyamide 11; polyamide 12; polyamide 9,10; polyamide 9,12; polyamide 9,13; polyamide 9,14; polyamide 9,15; polyamide 6,16; polyamide 9,36; polyamide 10,10; polyamide 10,12; polyamide 10,13; polyamide 10,14; polyamide 12,10; polyamide 12,12; polyamide 12,13; polyamide 12,14; polyamide 6,14; polyamide 6,13; polyamide 6,15; polyamide 6,16; polyamide 6,13.

Polyamide component (a) is present in the composition in about 30 to about 90 weight percent, or more preferably in about 30 to about 80 weight percent, or yet more preferably in about 30 to about 70 weight percent, where the weight percentages are based on the total weight of the composition.

Flame retardant (b) comprises at least one phosphinate of the formula (I), at least one diphosphinate of the formula (II), and/or at least one polymer of phosphinate (I) and/or disphosphinate (II),

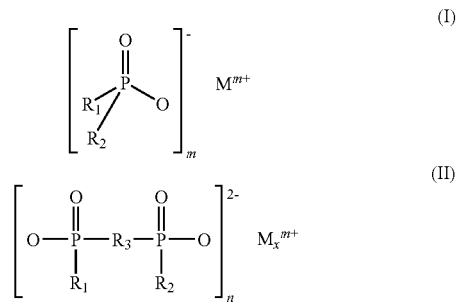

wherein $R_1$ and $R_2$ are identical or different and are $C_1$-$C_6$ alkyl, linear, or branched, and/or aryl; $R_3$ is $C_1$-$C_{10}$-alkylene, linear, or branched, $C_6$-$C_{10}$-arylene, -alkylarylene or -arylalkylene; M is calcium ions, magnesium ions, aluminum ions and/or zinc ions; m is 2 to 3; n is 1 or 3; and x is 1 or 2; and optionally comprising, condensation products of melamine and/or reaction products of melamine with phosphoric acid and/or reaction products of condensation products of melamine with phosphoric acid and/or comprising a mixture of these.

$R_1$ and $R_2$ may be identical or different and are preferably methyl, ethyl, n-propyl, isopropyl, n-butyl, tert-butyl, n-pentyl and/or phenyl. $R_3$ is preferably methylene, ethylene, n-propylene, isopropylene, n-butylene, tert-butylene, n-pentylene, n-octylene, n-dodecylene, or phenylene or naphthylene, or methylphenylene, ethylphenylene, tert-butylphenylene, methylnaphthylene, ethylnaphthylene or tert-butylnaphthylene, or phenylmethylene, phenylethylene, phenylpropylene or phenylbutylene. M is preferably aluminum ions or zinc ions.

These compounds are disclosed in U.S. Pat. No. 6,255,371, which is hereby incorporated by reference herein.

Preferred phosphinates are aluminum methylethylphosphinate, and, more preferably, aluminum diethylphosphinate.

The flame retardant (b) is present in the composition in an amount that is about 10 to about 45 weight percent of the amount of polyamide component (a). For example, if the composition comprises 40 weight percent of polyamide component (a), it comprises about 4 to about 18 weight percent flame retardant.

Zinc stannate generally exist in two forms of formula ZnSn(OH)$_6$ and ZnSnO$_3$, the latter being readily formed by heating the former to drive off water, and also in a third form of formula Zn$_2$SnO$_4$. ZnSn(OH)$_6$ and ZnSnO$_3$ have been marketed since 1986 under the trademarks Flamtard® H and Flamtard® S. Flamtard® S is made by heating Flamtard® H at 400° C. for a sufficient time to drive off the combined water. Because Flamtard® S has superior thermal stability, it is preferably used for our invention. Fully hydrated zinc stannate is less suitable for our invention because its decomposition temperature is low, about 200° C. But, partially hydrated zinc stannate compounds are suitable for the invention.

The partially hydrated zinc stannate compounds may be made by heating a zinc hydroxy stannate under conditions to drive off a proportion of the combined water present. Suitable heating temperatures are 300-400° C. It may be convenient to use the same kind of rotary kiln as is currently used for converting Flamtard® H to Flamtard® S, e.g. for 2-40 minutes. Optionally the zinc hydroxy stannate may be heated in a spin flash dryer, preferably at a temperature from 130 C. to 400° C. Or the zinc hydroxy stannate may be heated in a static oven e.g. for 30 minutes to 5 hours. Different heating regimes give rise to slightly different products which may be optimum for different purposes.

For the purposes of determining the amount of zinc stannate present, if the zinc stannate is a hydrate, the weight of the corresponding anhydrous form of the zinc stannate is used, thus only the amounts of Zn and $SnO_3$ in the compound are considered to contribute to the zinc stannate weight that is used in the calculation. The zinc stannate is present in the composition at 1 to 50%, preferably 1.5 to about 40 percent, that of the weight of flame retardant. In one embodiment the amount of zinc stannate present is 1 to 4 wt % of the total composition.

The composition may optionally comprise one or more inorganic reinforcing agents and/or fillers. Examples of inorganic reinforcing agents and/or fillers include one or more of glass fibers, glass flakes, kaolin, clay, talc, wollastonite, calcium carbonate, silica, carbon fibers, potassium titanate, etc. Glass fibers are preferred. The inorganic reinforcing agent and/or filler used in the present invention may be present in up to about 60 weight percent, or preferably in up to about 55 weight percent, or more preferably in up to about 50 weight percent, based on the total weight of the composition. When used, the reinforcing agents and/or fillers are preferably present in about 5 to about 60 weight percent, or more preferably in about 5 to about 55 weight percent, or more preferably in about 5 to 50 weight percent, based on the total weight of the composition.

The composition may optionally further comprise one or more additional flame retardant synergists. Examples include silicone, metal oxides such as silica, boehmite, aluminum oxide, iron oxide, titanium oxide, manganese oxide, magnesium oxide, zirconium oxide, zinc oxide, molybdenum oxide, cobalt oxide, bismuth oxide, chromium oxide, tin oxide, antimony oxide, nickel oxide, copper oxide and tungsten oxide, metal powder such as aluminum, iron, titanium, manganese, zinc, molybdenum, cobalt, bismuth, chromium, tin, antimony, nickel, copper and tungsten, and metal salts such as barium metaborate, zinc carbonate, magnesium carbonate, calcium carbonate, and barium carbonate. Preferred synergists are boehmite (aluminum hydroxide oxide (AlO(OH))) and/or aluminum oxide. When used, the one or more synergists are present in about 10 to about 20 weight percent, based on the total weight of synergist and flame retardant.

The composition may optionally comprise additional additives such as other polymers; impact modifiers; ultraviolet light stabilizers; heat stabilizers; antioxidants; processing aids; lubricants; and/or colorants including dyes, pigments, carbon black, and the like.

The compositions are made by melt-blending the components using any known methods. The component materials may be mixed to uniformity using a melt-mixer such as a single or twin-screw extruder, blender, kneader, Banbury mixer, etc. to give a resin composition. Or, part of the materials may be mixed in a melt-mixer, and the rest of the materials may then be added and further melt-mixed until uniform.

The compositions of the invention may be formed into articles using any known melt-processing means such as injection molding, blow molding, extrusion, or thermoforming.

Examples of articles that may be formed from the compositions of the present invention are electrical and electronic system component, including housings, electrical connectors and connector housings and cases, breaker housings, and contactor housings.

Another embodiment of the invention is a method for molding a flame retardant semiaromatic polyamide resin composition, comprising providing a blended flame retardant semiaromatic polyamide resin composition comprising
(a) a 30 to about 90 weight percent of a polyamide component comprising about 20 to 100 weight percent of at least one semiaromatic polyamide;
(b) at least one flame retardant comprising one or more of a phosphinate of the formula (I); a disphosphinate of the formula (II); and polymers of (I) and/or (II)

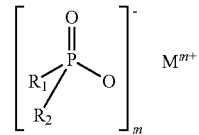

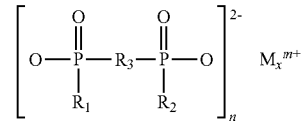

wherein $R_1$ and $R_2$ are identical or different and are $C_1$-$C_6$ alkyl, linear or branched, and/or aryl; $R_3$ is $C_1$-$C_{10}$-alkylene, linear or branched, $C_6$-$C_{10}$-arylene, -alkylarylene or -arylalkylene; M is calcium ions, magnesium ions, aluminum ions and/or zinc ions;
m is 2 to 3; n is 1 or 3; and x is 1 or 2;
(c) zinc stannate; and
(d) 0 to about 60 weight percent of at least one inorganic reinforcing agent and/or filler,
wherein the weight percentages of (a) and (d) are based on the total weight of the composition; wherein flame retardant (b) is present in an amount that is about 10 to about 45 percent of the weight of polyamide (a); and wherein zinc stannate (c) is present in an amount that is about 1 to about 50 percent of the weight of flame retardant (b); and
melting and injecting said polyamide resin composition in a molding machine;
at a temperature sufficient to provide a flowable melt;
wherein the injecting of the resin composition comprising components (a), (b), (c) and optionally (d) provides at least 50% less corrosion of a check ring than that of injecting a resin composition comprising components (a) (b) and optionally (d); as measured in a Mold Corrosion Test, as disclosed below in the Examples, using a molding machine having a nozzle head with said check ring. The injecting temperature is preferably 10 to 50° C. above the melt temperature of the resin composition.

The process disclosed above can be performed using any conventional molding machine. The molding machine can have a nozzle head with a check ring, or the molding machine can be absent a check ring, for instance a plunger type injection molding injection machine may be used. The Mold Corrosion test, used to assess the corrosion resistance of the compositions, is performed using a molding machine having a check ring.

EXAMPLES

Examples 1-4 and Comparative Examples 1

The compositions of Examples 1-4 and Comparative Examples 1 were prepared by melt-blending the components shown in Table 1 in a twin-screw extruder. After exiting the extruder, the blended compositions were cooled and cut into pellets. The pellets were surface coated with 0.1 weight percent of calcium montanate.

Each sample was rated V-0 according to the UL-94 flammability test on 1/16" and 1/32" thick bars.

Mold Corrosion Test:

The corrosive effect each composition had on molding equipment was tested by running each sample through a Toshiba EC40 molding machine equipped with a 25 mm screw for 12 hours continuously. Each sample was dried in advance to a moisture level below 0.1 weight percent. The hold up time in the molding machine was 8 minutes, the melt temperature was 325-330° C. and the mold temperature was 110° C.

The screw head was equipped with a check ring made of CPM9V steel. The outer diameter of the ring was measured prior to the molding run. After each molding run, the screw was disassembled, any polymeric residues were removed from the surface of the check ring, and the outer diameter of the ring was again measured. The difference in diameters is reported in Table 1. The surface appearance of the check ring was also checked visually and any observed corrosion is indicated in Table 1.

In the case of Comparative Example 2, only a slight amount of corrosion was seen on the surface on the front of the check ring after 12 hours of molding. In the case of Comparative Example 1, the entire surface of the check ring showed the effects of corrosion. Examples 1-4 showed no apparent corrosion.

The following ingredients are used in Table 1:

Polyamide 6,T/6,6 refers to HTN 502, available from E.I. du Pont de Neumours.

Boehmite refers to Celasule BMT-33, available from Kawai Sekkai Kogyo.

Zinc stannate used was Flamtard® S, available from William Blythe Limited. The amount of Zinc stannate used as a percentage of the flame retardant is given in Table 1.

Flame retardant refers to Exolit® OP 1230, an aluminum diethylphosphinate available from Clariant.

Glass fibers refers to FT756D/X, available from Asahi Fiber Glass.

TABLE 1

| | Comp. Ex. 1 | Comp. Ex. 2 | Ex. 1 | Ex. 2 | Ex. 3 | Ex. 4 |
|---|---|---|---|---|---|---|
| Polyamide 6,T/6,6 | 56 | 55.9 | 55.8 | 55 | 53 | 52 |
| Flame retardant | 12 | 12 | 12 | 12 | 12 | 12 |
| Zinc stannate | 0 | 0.1 | 0.2 | 1 | 3 | 4 |
| Zinc stannate as a percentage of weight of flame retardant | 0 | 0.8 | 1.7 | 8.3 | 25 | 33.3 |
| Glass fibers | 30 | 30 | 30 | 30 | 30 | 30 |
| Boehmite | 2 | 2 | 2 | 2 | 2 | 2 |
| Diameter change of check ring after 12 hr testing (mm) | −0.062 | −0.017 | 0 | 0 | 0 | 0 |
| Check ring surface appearance | corroded | Slightly corroded | good | good | good | good |

Ingredient quantities are given in weight percentages based on the total weight of the composition.

What is claimed is:

1. A flame retardant polyamide resin composition, comprising:
   (a) about 30 to about 90 weight percent of a polyamide component comprising about 60 to 100 weight percent of at least one semiaromatic polyamide wherein the semiaromatic polyamide is hexamethylene adipamide/hexamethylene terephthalamide copolyamide (polyamide 6,T/6,6);
   (b) at least one flame retardant comprising aluminum diethylphosphinate and/or aluminum methylethylphosphinate;
   (c) zinc stannate; and
   (d) 0 to about 60 weight percent of at least one inorganic reinforcing agent and/or filler,
wherein the weight percentages of (a) and (d) are based on the total weight of the composition; wherein flame retardant (b) is present in an amount that is about 10 to about 45 percent of the weight of polyamide (a); and wherein zinc stannate (c) is present in an amount that is about 1 to about 50 percent of the weight of flame retardant (b) wherein the composition provides at least 50% less corrosion to a check ring compared to a composition having components (a), (b), and optionally (d), as measured by a Mold Corrosion Test.

2. The composition of claim 1, wherein the zinc stannate (c) is present in an amount that is about 1.5 to about 40 percent of the weight of flame retardant (b).

3. The composition of claim 1, wherein the at least one inorganic reinforcing agent and/or filler is present in about 5 to about 60 weight percent, based on the total weight of the composition.

4. The composition of claim 1, wherein the inorganic reinforcing agent is glass fibers.

5. The composition of claim 1, wherein the zinc stannate is present in an amount that is about 1.5 to about 40 percent of the weight of the flame retardant.

6. The composition of claim 1 further comprising 0.2 to 4 wt. % of the zinc stannate, based on the total weight of the composition.

7. The composition of claim 1 further comprising 1 to 4 wt. % of the zinc stannate, based on the total weight of the composition.

8. The composition of claim 1, wherein the zinc stannate is $ZnSnO_3$.

9. An article comprising the composition of claim 1.

10. A method for molding a flame retardant semiaromatic polyamide resin composition, comprising
   providing a blended flame retardant semiaromatic polyamide resin composition comprising
   (a) a 30 to about 90 weight percent of a polyamide component comprising about 20 to 100 weight percent of at least one semiaromatic polyamide;
   (b) at least one flame retardant comprising one or more of a phosphinate of the formula (I); a disphosphinate of the formula (II); and polymers of (I) and/or (II)

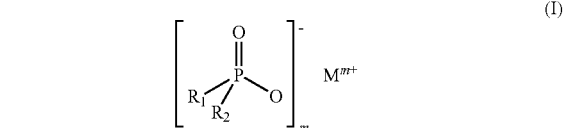

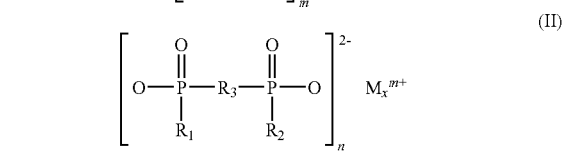

wherein $R_1$ and $R_2$ are identical or different and are $C_1$-$C_6$ alkyl, linear or branched, and/or aryl; $R_3$ is $C_1$-$C_{10}$-alkylene, linear or branched, $C_6$-$C_{10}$-arylene, -alkylarylene or -arylalkylene; M is calcium ions, magnesium ions, aluminum ions and/or zinc ions; m is 2 to 3; n is 1 or 3; and x is 1 or 2;

(c) zinc stannate; and (d) 0 to about 60 weight percent of at least one inorganic reinforcing agent and/or filler, wherein the weight percentages of (a) and (d) are based on the total weight of the composition; wherein flame retardant (b) is present in an amount that is about 10 to about 45 percent of the weight of polyamide (a); and wherein zinc stannate (c) is present in an amount that is about 1 to about 50 percent of the weight of flame retardant (b); and melting and injecting said polyamide resin composition in a molding machine; at a temperature sufficient to provide a flowable melt;

wherein the injecting of the resin composition comprising components (a), (b), (c) and optionally (d) provides at least 50% less corrosion of a check ring than that of injecting a resin composition comprising components (a) (b) and optionally (d); as measured in a Mold Corrosion Test using a molding machine having a nozzle head with said check ring.

* * * * *